United States Patent
Biondo et al.

(10) Patent No.: US 8,360,213 B2
(45) Date of Patent: Jan. 29, 2013

(54) VENTILATED BRAKE DISC

(75) Inventors: Simone Biondo, Milan (IT); Stefano Medici, Bergamo (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 493 days.

(21) Appl. No.: 12/598,161

(22) PCT Filed: Apr. 23, 2008

(86) PCT No.: PCT/IB2008/051555
§ 371 (c)(1),
(2), (4) Date: Oct. 29, 2009

(87) PCT Pub. No.: WO2008/135876
PCT Pub. Date: Nov. 13, 2008

(65) Prior Publication Data
US 2010/0084231 A1    Apr. 8, 2010

(30) Foreign Application Priority Data
May 3, 2007   (IT) .............................. BS2007A0067

(51) Int. Cl.
*F16D 65/10*    (2006.01)
(52) U.S. Cl. ........................... 188/218 XL; 188/264 AA
(58) Field of Classification Search ............ 188/218 XL, 188/264 A, 264 AA
See application file for complete search history.

(56) References Cited

U.S. PATENT DOCUMENTS

| | | | | |
|---|---|---|---|---|
| 4,982,127 A | * | 1/1991 | Marandet | 310/105 |
| 5,526,905 A | * | 6/1996 | Shimazu et al. | 188/218 XL |
| 7,849,980 B2 | * | 12/2010 | Kawai et al. | 188/218 XL |
| 8,037,980 B2 | * | 10/2011 | Pahle | 188/218 XL |
| 2004/0084262 A1 | * | 5/2004 | Baylis et al. | 188/218 XL |
| 2004/0178030 A1 | * | 9/2004 | Pacchiana et al. | 188/218 XL |
| 2004/0182660 A1 | * | 9/2004 | Cavagna et al. | 188/218 XL |

FOREIGN PATENT DOCUMENTS

| | | |
|---|---|---|
| DE | 29823373 | 5/1999 |
| DE | 19843399 | 3/2000 |
| DE | 10358088 | 7/2005 |
| FR | 2878593 | 6/2006 |
| WO | 2006/046258 | 5/2006 |

* cited by examiner

*Primary Examiner* — Christopher Schwartz
(74) *Attorney, Agent, or Firm* — Shoemaker and Mattare (57) ABSTRACT

The invention relates to a brake disc comprising a support bell, intended for being connected to a wheel hub of a vehicle, and a braking band intended for cooperating with a caliper arranged astride of the brake disc. The braking band comprises two flanges connected by a plurality of connecting elements that define ventilation channels. The brake disc is characterized in that it comprises driving elements between the braking band and the bell, which elements improve the efficiency of the ventilation inside the braking band, as well as the mechanical deformation of the brake disc during the braking step.

21 Claims, 8 Drawing Sheets

VENTILATED BRAKE DISC

FIELD OF THE INVENTION

The object of the present invention is a disc brake for vehicles, in particular for motor vehicles.

BACKGROUND OF THE INVENTION

Brakes in general, and disc brakes in particular, are capable of slowing down and/or stopping the vehicle transforming the kinetic energy thereof into thermal energy by a friction action between disc and pads. For this reason, to keep the efficiency of the brakes themselves, it is important not to make the disc and the pads become overheated. It is therefore important to obtain an efficient dissipation of the heat in the environment.

To this end, brake discs are known, comprising a pair of sided flanges which in turn comprise outside friction surfaces and inside ventilation channels.

The flanges are normally coupled to each other by connecting elements, which may be pins or tongues. Preferably, the connecting elements are shaped so as to form inside ventilation channels for cooling the brake disc.

The disc comprises a support bell for said braking band, the support bell being intended for being connected to the wheel hub of the vehicle, and being connected to the braking band by driving elements.

Even though such known discs are widely appreciated, they are not free from defects.

In fact, it has been noted that the disc ventilation obtained with the known discs is not optimised and that the consequent heat dissipation is not fully efficient. The poor dissipation efficiency is essentially due to the interference of the driving elements with said ventilation channels that do not allow optimum air flow.

In fact, said driving elements of the prior art have a tangential thickness in the pin or tongue portion on the side of the flange inside diameter that interferes with the ventilation channels; in other words the tongue or pin blocks at least partly the inlet to the ventilation channel, thus limiting the air flow rate. Such thickness is imposed by mechanical resistance requirements.

SUMMARY OF THE INVENTION

The object of the present invention is to devise and provide a brake disc which should allow obviating the disadvantages mentioned above with reference to the prior art.

In particular, the task of the present invention is to provide a brake disc which should ensure optimised ventilation and thereby heat dissipation and an improved control of the mechanical deformation during the braking step.

Such object and such task are achieved by the brake discs in accordance with the annexed independent claims.

BRIEF DESCRIPTION OF THE DRAWINGS

Further features and advantages of the brake disc according to the invention will appear more clearly from the following description of preferred embodiments thereof, given by way of a non-limiting example with reference to the annexed figures, wherein.

DETAILED DESCRIPTION OF THE INVENTION

Figure 1:
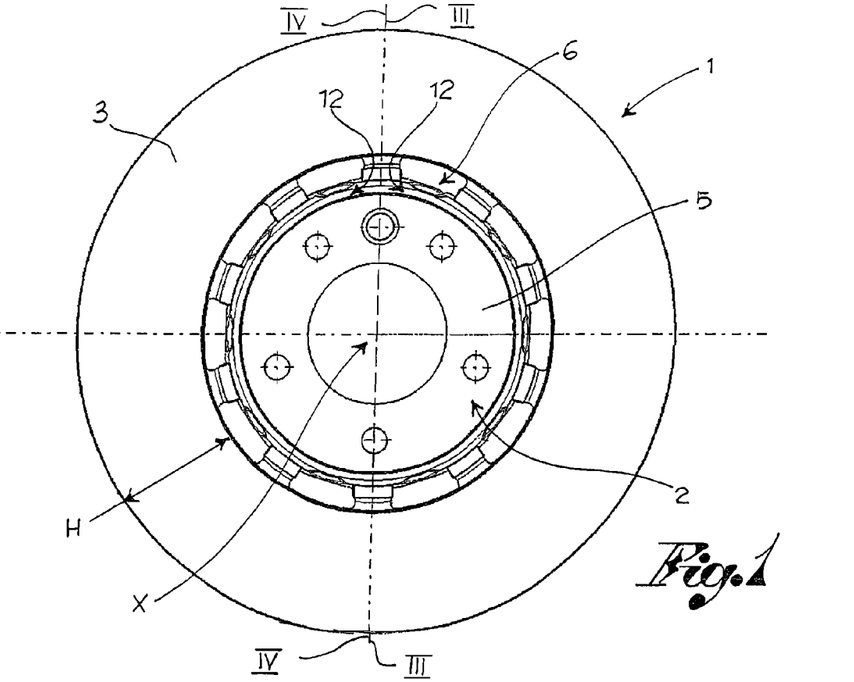
FIG. 1 shows a view of a brake disc according to the invention.
Figure 2:
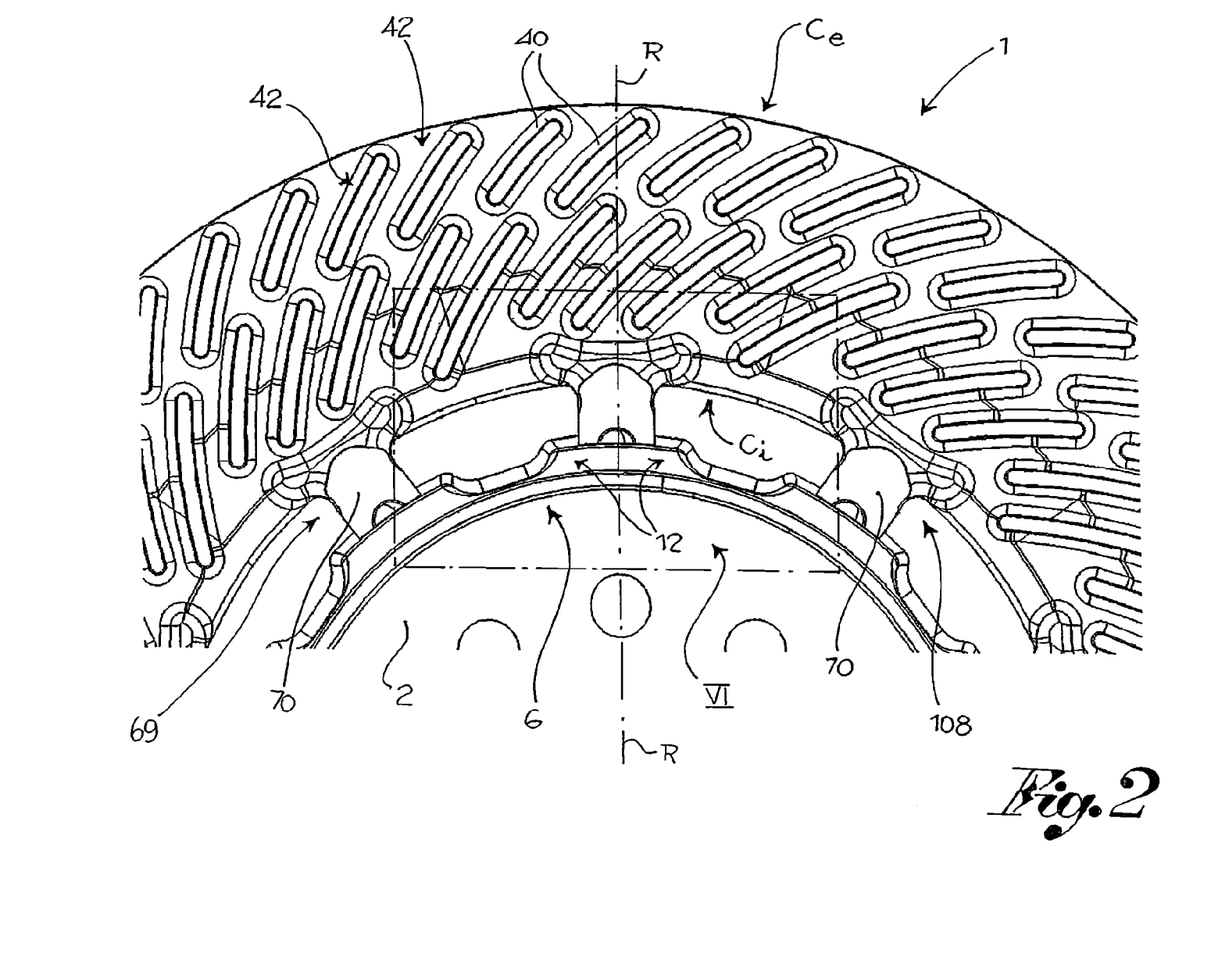
FIG. 2 shows a partially sectioned view of a portion of the brake disc of FIG. 1, according to line II-II of FIG. 3.
Figure 3:
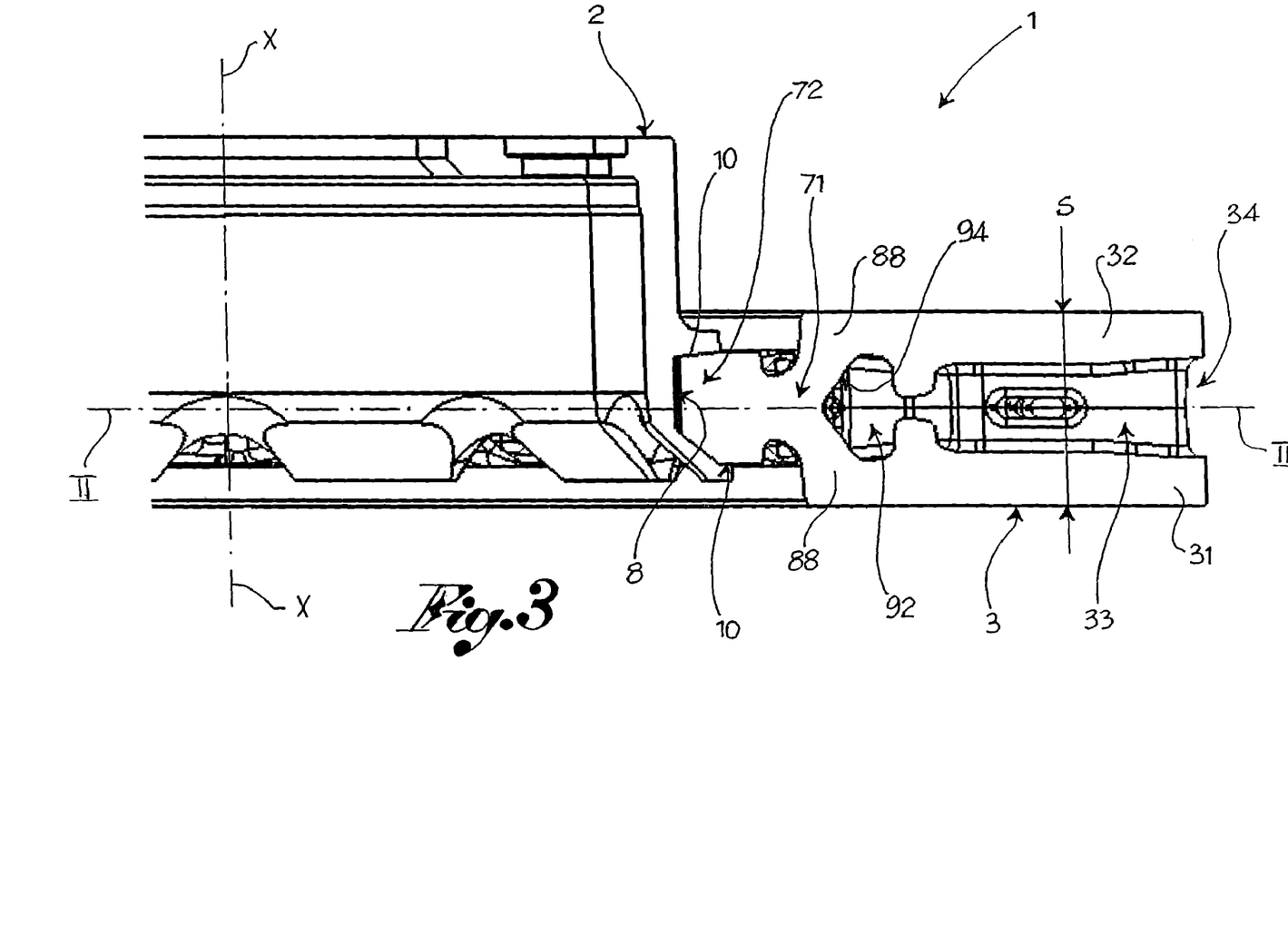
FIG. 3 shows a section view of the brake disc of FIG. 1, along the section line III-III of FIG. 1.
Figure 4:
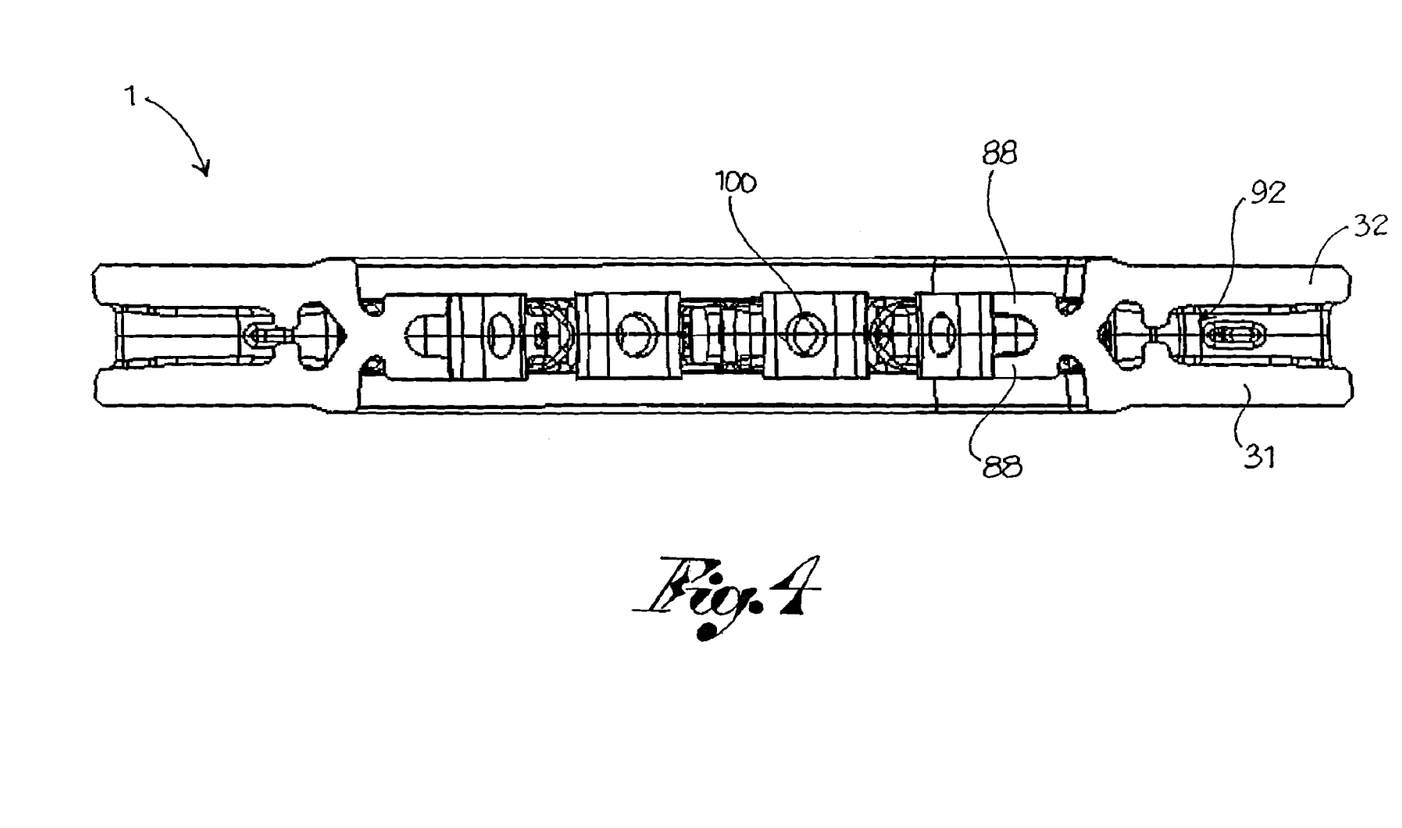
FIG. 4 shows a section view of the braking band of the brake disc of FIG. 1, along the section line IV-IV of FIG. 1.
Figure 5:
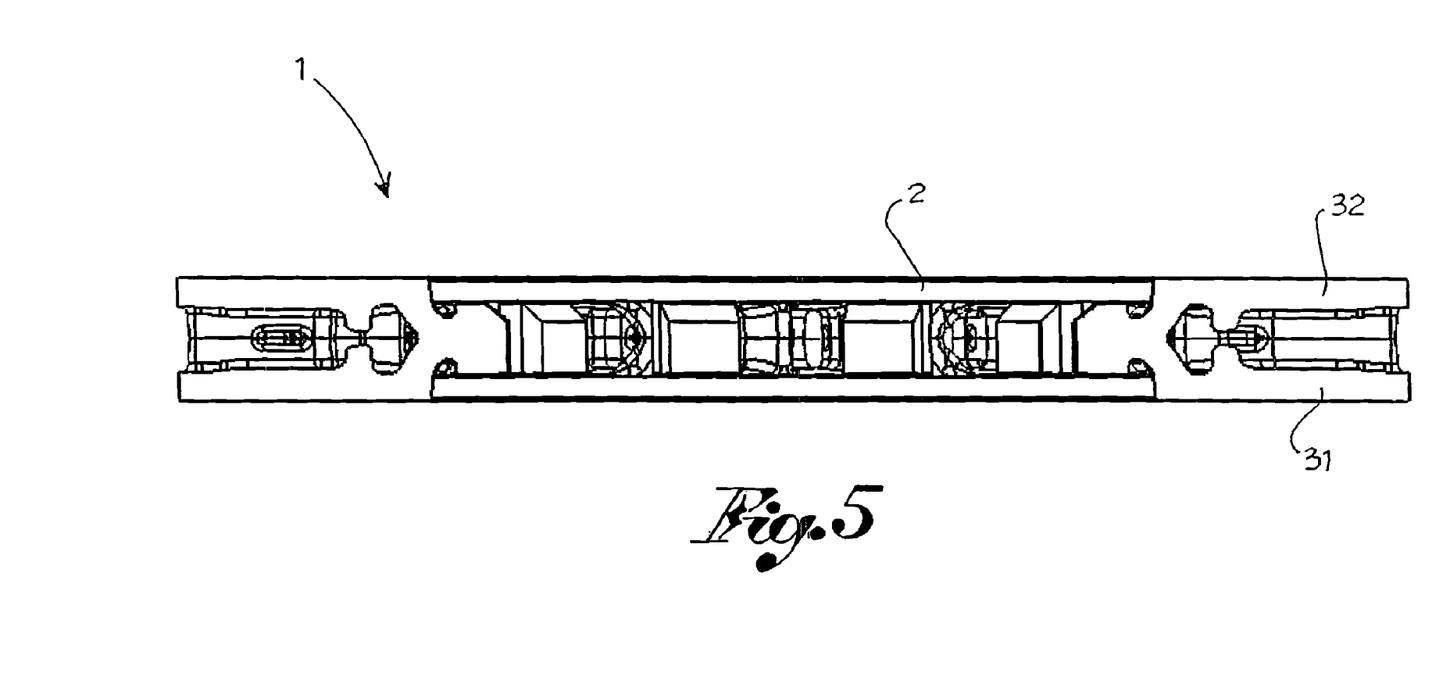
FIG. 5 shows a section view of the braking band of the brake disc of FIG. 1, along the section line IV-IV of FIG. 1, according to an embodiment variation of the present invention.
Figure 6:
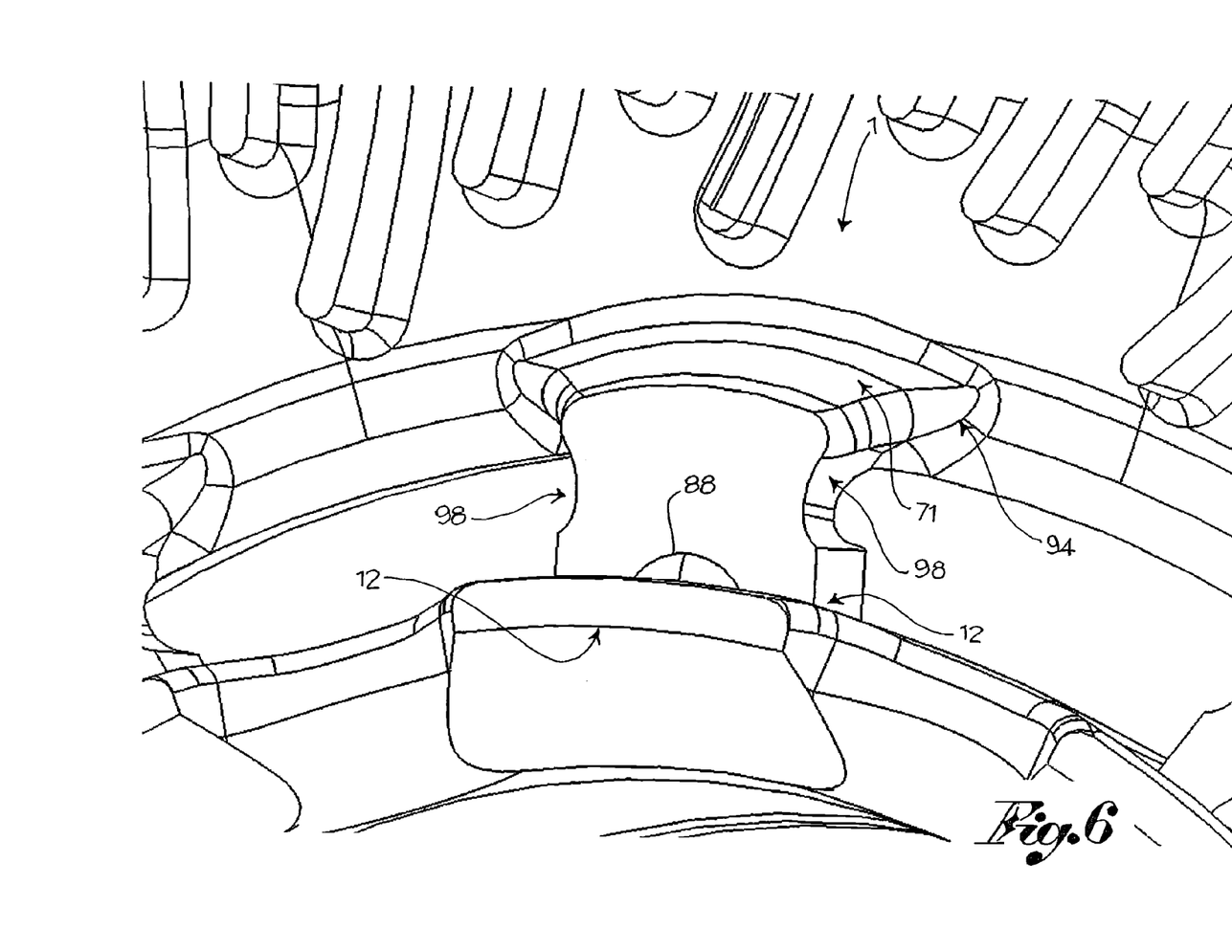
FIG. 6 shows a perspective view of the enlarged detail VI of the brake disc of FIG. 2.
Figure 7:
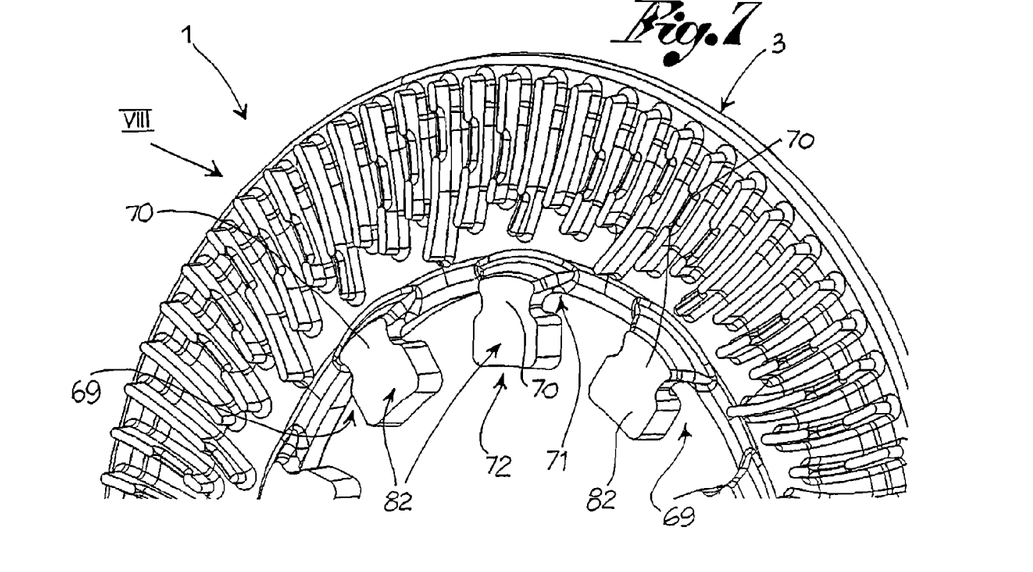
FIG. 7 shows a perspective sectioned view of a brake disc according to a further embodiment of the present invention.
Figure 8:
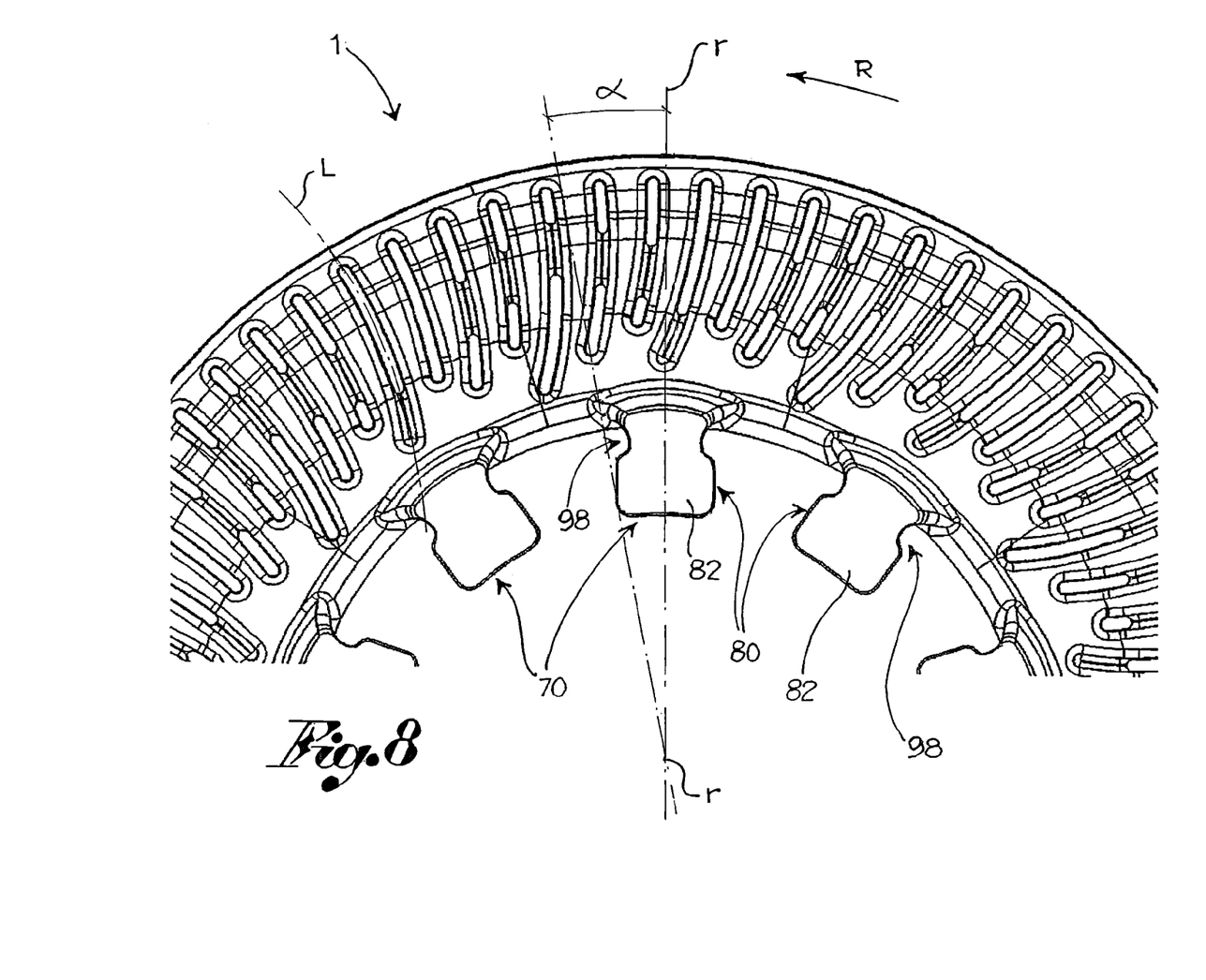
FIG. 8 shows a front view of the brake disc of FIG. 7, from the side of arrow VIII of FIG. 7.
Figure 9:
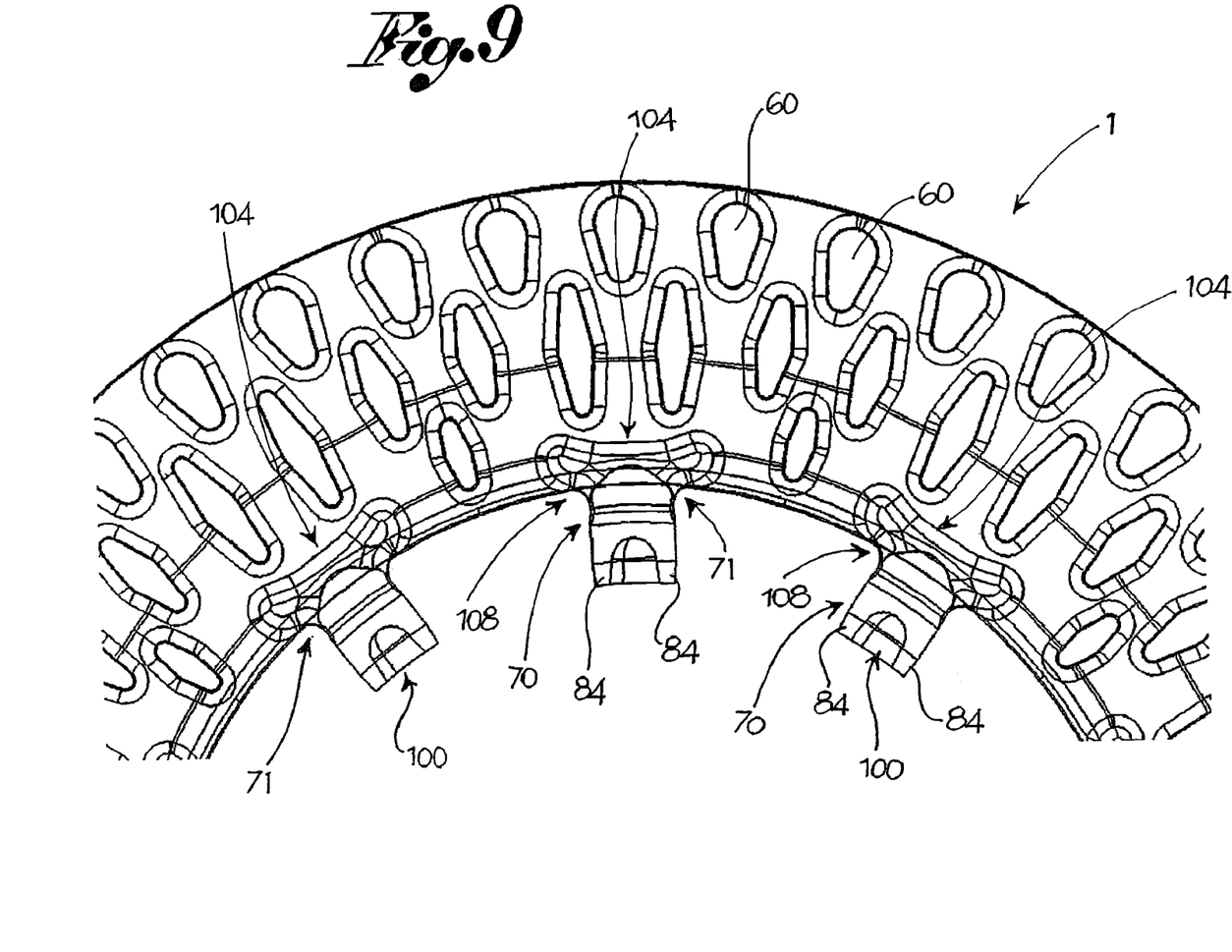
FIG. 9 shows a front partly sectioned view of a brake disc according to a further embodiment of the present invention.

With reference to the above figures, reference numeral 1 globally denotes a brake disc according to the invention.

The brake disc 1 according to the invention comprises two portions that share an axis of rotation X. A first inner portion, the support bell 2, is intended for being connected to the wheel hub of a vehicle, whereas the remaining peripheral portion, the braking band 3, is intended for cooperating with the associable caliper of the disc brake arranged astride of the brake disc for exerting the braking action on the vehicle.

The support bell 2 comprises a central portion 5 intended to be connected, for example in a conventional manner, to the wheel hub of a vehicle and a peripheral annular portion 6 which is projecting from the central portion 5, for example according to a direction substantially parallel to the axis of rotation X-X of the brake disc.

The support bell 2 comprises radial seats 8 obtained in the peripheral annular portion 6. Such radial seats 8 are delimited by axial and radial walls 10, 12 preferably made integral with the body of bell 2, so as to be integral therewith.

The braking band 3 comprises an annular disc of predetermined thickness S and height H, which is coaxially supported by the peripheral annular portion 6 of the support bell 2. The braking band 3 is intended for cooperating with the brake disc calipers for exerting the braking action on the vehicle.

The braking band 3 is, in an in se known manner, of the ventilated type. The ventilated band 3 comprises two flanges 31 and 32 connected by a plurality of connecting elements 33. The connecting elements 33 define ventilation channels 34 for the cooling air.

In the disc brake according to the present invention, a plurality of connecting elements 33 having different shapes and/or dimensions are arranged according to a module that repeats an a entire number of times along the braking band 3.

With reference to the brake disc 1 and to the axis of rotation X thereof:

any direction parallel to said axis X is defined as "axial";

any direction perpendicular to axis X and incident therewith is defined as "radial", and the direction of any circumference centred on said axis X and laying on a plane perpendicular thereto, or the direction of a tangent thereof, is defined as "circumferential" or "tangential".

The braking band 3 is a circular crown delimited by a radially inner circumference $C_i$ and by a radially outer circumference $C_e$.

According to an embodiment, the connecting elements 33 of flanges 31, 32 of the braking band 3 of the brake disc 1 comprise tongues 40.

The term "tongue" herein and hereinafter means a structure having thin and elongated section.

In relation to the section of a tongue 40 made in the middle plane of the brake disc 1 it is possible to define a middle line L. Such middle line L may for example be defined as the place of the centres of the circumferences inscribed in the tongue profile.

In accordance with some embodiments, the middle line L of the tongue is curved. The curved middle line L may have concavity directed towards the preferential direction of rotation R of the disc, or it may have concavity directed against the preferential direction of rotation R of the disc.

In relation to the section of a tongue 40, it is possible to define also a chord $C_o$. Such chord Co may for example be defined as the segment of straight line that joins the centres of the circumferences inscribed in the profile of the two tongue ends.

Tongues 40 may have different length according to the specific requirements but in any case they develop along the middle line L by a length considerably greater than what they develop transversely thereto.

Tongue 40 is uninterruptedly connected to each of the two flanges 31 and 32. Preferably, the connection between tongue 40 and flanges 31 and 32 is obtained by a jointing portion 42.

Tongues 40 are preferably arranged into 8 arrays along the circular crown of the braking band 3.

As will be clear to the expert, the tongues are shaped and arranged in a way substantially similar to that of the blades of a centrifugal turbo machine, wherein the fluid flow has a local direction substantially parallel to the middle line L of the blades.

According to a possible embodiment, the connecting elements 33 comprise pins 60. Pins 60 differ from tongues 40 in that they have stockier sections 40. Also for pins 60 it is possible to define a middle line L similar to what done above for tongues 40. Considering the extension of the pin along the middle line L and the extension transversal thereto, the difference between the two extensions is less strong than what it is for a tongue.

The brake disc comprises driving elements 69 intended for constraining the braking band 3 to the support bell 2. Such driving elements 69 are preferably made integral with the braking band 3.

The driving elements 69 are at least partly seated in the special radial seats 8 obtained in the radial periphery of the support bell 2.

The driving elements 69 comprise a driving body 70 delimited at opposite ends by a root 71 and a protrusion 72.

Advantageously, the driving body 70 has an axial dimension smaller than the axial dimension of the ventilation channel enclosed between the flanges.

Protrusion 72 is intended for inserting into the special radial seat 8 obtained in the support bell 2, whereas root 71 provides a mechanical connection, preferably integral, between the driving element 69 and the braking band 3.

In accordance with an embodiment of the invention, protrusion 72 is seated within seat 8 so as to be constrained in tangential direction and in axial direction, while it is free to slide in radial direction.

For example, the driving elements 69 comprise a protrusion 72 having the shape of a prismatic projection with substantially quadrangular section, suitable for being at least partly seated in seats 8 for connecting in rotation the braking band 3 with the support bell 2. According to an embodiment, said protrusion 72 comprises side faces 80 both parallel to a radial axis r-r 10 passing by the centre of the projection itself and by said axis of rotation X-X of the brake disc.

In an assembled configuration of the brake disc, the side faces 80 of protrusion 72 arrange perpendicular to the axial walls 10 of the radial seats 8. Protrusion 72 further comprises front faces 82 substantially perpendicular to the side faces 80.

As an alternative it is possible to use also protrusions 72 having different shapes.

For example, according to a further embodiment, the side faces 80 of protrusion 72 are not parallel to each other.

According to an embodiment, the side faces 80 of projection 4 are not parallel to each other and each of them forms an angle a with a direction parallel to the radial axis r-r passing by the centre of protrusion 72. Angle a may range, according to the specific project requirements, between 0° and 3°. As a consequence, angle 2α consisting of two opposite faces 40 may range between 0° and 6°.

Preferably, protrusion 72 has side faces 80 parallel by the first portion thereof adjacent the root and converging in the second end portion where a chamber 84 is obtained.

The configuration with the chamfered edges may be adopted, besides starting from a geometry with parallel side faces 80, also starting from a geometry with slightly inclined side faces 80.

Irrespective of the geometry selected, the side faces 80 of the single protrusion 72 are arranged in such as way as to limit the surface roughness within predetermined values. Preferably the side faces 80 of protrusions 72 have a mean surface roughness Ra below $6.4 \times 10^{-6}$ meters.

Radial seats 8 are perfectly counter-shaped that is, complementary to the side and front faces 80, 82 of the respective protrusions 72 or at least to some portions thereof. In other words the radial seats 8 surround at least partly protrusions 72 so as to constrain the movements thereof in the axial direction and in the tangential direction.

The coupling between protrusion 72 and seat 8 is not a coupling with interference and envisages a clearance even if very limited.

The surfaces of faces 80, 82 and of walls 10, 12 are closely coupled to each other without any adhesion of the one to the other. In other words, the surfaces of faces 80, 82 and of walls 10, 12 are closely coupled and disconnected.

In the light of what said, it will be clear to the man skilled in the art that wall 10, 12 and side faces 80, 82 are made in such a way as to allow that while the movements in the axial and tangential directions are prevented for resting faces 80, 82 on walls 10, 12, the radial movement of the single protrusion 72 inside the single seat 8 is not prevented by anything.

In particular the radial movement is not prevented by macroscopic joints or reciprocal micro-penetrations of the two different materials that make up protrusion 72 and walls 10, 12 of seat 8. Such reciprocal micro-penetrations could occur if there was more surface roughness of the surfaces.

Resting on the walls of the respective seats 8, protrusions 72 are capable of transmitting the braking torque from band 3 to bell 2.

Roots 71 on the other hand have the task of anchoring the driving element to the braking band and of conveying the braking forces exerted by friction on the two flanges 31 and 32, so as to transfer them to protrusions 72 to then transmit them to bell 2.

Roots 71 of the driving elements according to the invention, have a particular shape definable as Y or T.

In particular, the driving elements 69, in the proximity of roots 71, where they engage on the braking band 3, branch off into a pair of branches 88, each integrally connected to a relevant flange 31, 32 of the braking band 3.

Said branches 88 are preferably symmetric relative to a symmetry plane of the disc, perpendicular to the axis of rotation X-X of the disc and passing by the axial centre line of the disc itself.

Advantageously, the 'Y' portion delimits a space 92 for gathering the cooling air suitable for conveying the cooling air sucked by the hub directly between the flanges avoiding this air flow from dispersing.

Advantageously, the fact that the driving body 70 has an axial dimension smaller than the axial dimension of the ventilation channel allows an air passage that arrives from both the axial sides of the disc, that is, from inside the car and from the wheel side.

Moreover, the two branches of the 'Y' portion allow avoiding the trail effect typical of the driving elements of the prior art.

Preferably, at a connecting portion of branches 88 of roots 71 to the respective flanges, said roots comprise at least one jointing portion 94. Determining in the design stage the specific jointing radius must take into account the type of material used for making the braking band 3 in a known manner.

Preferably, roots 71 have such a tangential extension as to concern at least two consecutive tongues or adjacent to one another.

Preferably, the driving elements 69, at an intermediate portion thereof, comprised between roots 71 and protrusion 72, envisage at least one recessed portion 98, suitable for channeling the cooling air flow between the flanges.

According to an embodiment, said protrusions envisage a lightening 100, that is, a cavity at least partly passing through the protrusions themselves.

According to a possible embodiment, roots 71, at the connecting zone to the braking band 3, exhibit an arc portion 104, preferably symmetrical relative to a radial axis r-r.

According to an embodiment, said arc portion 104 exhibits a concave pattern on the side of the associable braking band 3.

According to a further embodiment, said arc portion 104 comprises a convex pattern on the side of the associable braking band 3.

According to an embodiment, the root takes a globally tapered pattern; in other words, it comprises a pair of sides 108 that narrow towards the driving body.

As can be understood from the above description, the brake discs according to the present invention allow overcoming the disadvantages mentioned with reference to the brake discs of the prior art.

In fact, the fact that the driving elements 69 engage on both flanges 31 and 32, determines a considerable structural advantage over other known solutions wherein the driving elements engage on a single flange. The engagement on both flanges in fact allows the driving elements to gather the strains generated on the single flange by the braking action, without the need of transmitting such strains from one flange to the other through the connecting element 33.

In this way, the connecting elements 33, for example tongues 40 or pins 60 may be sized, from a structural point of view, for mainly withstanding only the compression force exerted by the caliper during the braking action. From a structural point of view, in the brake disc 1 according to the invention the connecting elements 33 are not substantially required the transmission of other forces.

Another criterion at the basis of the design of the connecting elements 33, either tongues 40 or pins 60, is the definition of the ventilation channels 34 of the brake disc 1.

From the fluid-dynamic point of view it is important to note how the particular shape of the driving elements 69 allows leaving free access to the air circulation inside all the ventilation channels 34. In particular, the Y or T pattern of roots 71, both in axial direction and in tangential direction, allows anchoring the driving elements 69 to the braking band in a structurally strong and effective manner while allowing free access to the ventilation channels 34 for the cooling air.

Such solution is preferable over other known solutions wherein the single driving element 69 extends until its same root becomes a connecting element (pin or tongue). In fact in such type of known solution the structural needs and the fluid-dynamic ones are in conflict.

In particular, in such known solution, the enlargement of the root of the driving element 69 affects the access of the air to the ventilation channel radially aligned to the driving element 69 itself. On the other hand, in the same known solution, a driving element 69 that does not envisage any enlargement at the root, affects the efficient transmission of the forces between the braking band and the driving element 69 itself.

The solution according to the invention on the other hand, in relation to the driving elements, allows advantageously disconnecting the structural functions from the fluid-dynamic functions.

Moreover, the brake disc according to the present invention allows radial sliding between the connecting elements, and therefore the braking band, and the bell. Therefore, any thermal expansions due to the heating of the brake disc do not imply a loss of perpendicularity between the braking band and the axis of rotation of the disc.

A man skilled in the art may make several changes, adjustments and replacements of elements with other functionally equivalent ones to the embodiments of the brake discs described above in order to meet incidental needs, without departing from the scope of the following claims. Each of the features described as belonging to a possible embodiment can be obtained independently of the other embodiments described.

The invention claimed is:

1. A brake disc having an axis of rotation, comprising:
   a support bell, intended for being connected to a wheel hub of a vehicle,
   a braking band, intended for cooperating with a caliper of a disc brake, comprising two flanges connected by a plurality of connecting elements that define ventilation channels,
   at least one driving element suitable for connecting the support bell and the braking band to each other so as to transmit the braking forces exchanged between the braking band and the caliper to the hub, wherein said driving element comprises a driving body that extends between a root and a protrusion, the root being connected to the braking band and said protrusion being at least partly inserted in a special seat of the support bell, the root having a 'Y' shape having a pair of branches, each branch being connected to a relevant flange of the braking band, wherein
   said protrusions have a lightening cavity at least partly passing through the protrusions themselves.

2. Brake disc according to claim 1, wherein the roots at the connecting zone to the braking band have an arc portion.

3. Brake disc according to claim 2, wherein said arc portion is symmetrical relative to a radial axis.

4. Brake disc according to claim 2, wherein said arc portion has a concave pattern on the side of the associable braking band.

5. Brake disc according to claim 1, wherein the side faces of the protrusion are not parallel to each other.

6. Brake disc according to claim 5, wherein each of said side faces forms an angle with a direction parallel to the radial axis passing by the center of the protrusion.

7. Brake disc according to claim 6, wherein said angle is comprised between 0° and 3°.

8. Brake disc according to claim 1, wherein said protrusion comprises side faces both parallel to a radial axis passing by the center of the projection itself and by said axis of rotation of the brake disc.

9. Brake disc according to claim 8, wherein the protrusion has side faces parallel at said driving body and converging at said protrusion wherein a chamfer is obtained.

10. Brake disc according to claim 1, wherein said branches are symmetrical relative to a center line plane of the braking band perpendicular to the axis of rotation of the brake disc.

11. Brake disc according to claim 1, wherein said root at the branching off of said branches delimits a space for gathering the cooling air suitable for conveying the cooling air directly between the flanges avoiding said air flow from dispersing.

12. Brake disc according to claim 1, wherein at a connecting portion of the branches of the roots with the respective flanges, said roots comprise at least one jointing portion with the flanges.

13. Brake disc according to claim 1, wherein said roots have such a tangential extension as to concern at least two consecutive tongues or adjacent to each other.

14. Brake disc according to claim 1, wherein the driving elements envisage, at a driving body comprised between the roots and the protrusion, at least one recessed portion suitable for channeling the cooling air flow between the flanges.

15. Brake disc according to claim 1, wherein the root takes a globally tapered pattern.

16. Brake disc according to claim 1, wherein said root comprises a pair of sides that narrow towards the driving body.

17. Brake disc according to claim 1, wherein the driving body has an axial dimension smaller than the axial dimension of the ventilation channel.

18. Brake disc according to claim 1, wherein the protrusion is seated within the seat so as to be constrained in tangential direction and in axial direction, while it is free to slide in radial direction.

19. Brake disc according to claim 1, wherein said protrusion is shaped as prismatic projection with substantially quadrangular section, suitable for being at least partly seated in the seats for connecting in rotation the braking band with the support bell.

20. Brake disc according to claim 1, wherein the side faces of the protrusions have a mean surface roughness Ra below 6.4×10-6 meters.

21. A brake disc having an axis of rotation, comprising:
a support bell, intended for being connected to a wheel hub of a vehicle,
a braking band, intended for cooperating with a caliper of the disc brake, comprising two flanges connected by a plurality of connecting elements that define ventilation channels,
at least one driving element suitable for connecting the support bell and the braking band to each other so as to transmit the braking forces exchanged between the braking band and the caliper to the hub, wherein said driving element comprises a driving body that extends between a root and a protrusion, the root being connected to the braking band and protrusion being at least partly inserted in a special seat of the support bell, the root having a 'Y' shape having a pair of branches, each branch being connected to a relevant flange of the braking band, wherein
the roots at the connecting zone of the braking band have an arc portion and
said arc portion forms a convex pattern on a side of the braking band.

\* \* \* \* \*